US010252728B2

(12) United States Patent
Okitsu et al.

(10) Patent No.: US 10,252,728 B2
(45) Date of Patent: Apr. 9, 2019

(54) INFORMATION PROVIDING METHOD FOR VEHICLE AND INFORMATION PROVIDING DEVICE FOR VEHICLE

(71) Applicant: Nissan Motor Co., Ltd., Yokohama-shi, Kanagawa (JP)

(72) Inventors: Yuta Okitsu, Kanagawa (JP);
Hiromoto Shimizu, Kanagawa (JP);
Haruki Satou, Kanagawa (JP);
Tadafumi Noji, Kanagawa (JP);
Tetsuya Shinohara, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/765,737

(22) PCT Filed: Oct. 30, 2015

(86) PCT No.: PCT/JP2015/005472
§ 371 (c)(1),
(2) Date: Apr. 4, 2018

(87) PCT Pub. No.: WO2017/072821
PCT Pub. Date: May 4, 2017

(65) Prior Publication Data
US 2018/0312171 A1    Nov. 1, 2018

(51) Int. Cl.
*F02N 11/08*    (2006.01)
*B60T 7/12*    (2006.01)
*B60T 17/22*    (2006.01)
*B60W 10/06*    (2006.01)
(Continued)

(52) U.S. Cl.
CPC ............... *B60W 50/14* (2013.01); *B60T 7/12* (2013.01); *B60T 17/22* (2013.01); *B60W 10/06* (2013.01);
(Continued)

(58) Field of Classification Search
CPC .... B60W 50/14; B60W 30/192; B60W 10/06; B60W 10/18; B60W 2540/12;
(Continued)

(56) References Cited

U.S. PATENT DOCUMENTS

2005/0199209 A1* 9/2005 Shimokawa ........ F02N 11/0822
123/179.4
2006/0224279 A1* 10/2006 Mori .................... F02N 11/0833
701/1
(Continued)

FOREIGN PATENT DOCUMENTS

JP          6-8130 U      2/1994
JP      2013-132991 A    7/2013
(Continued)

*Primary Examiner* — Michael J Zanelli
(74) *Attorney, Agent, or Firm* — Global IP Counselors, LLP

(57) ABSTRACT

In an information providing method for a vehicle, an engine is stopped automatically when a predetermined permission condition is satisfied in a state in which the vehicle is stopped by a brake operation executed by a driver. The permission condition is a brake operation amount of a brake having reached a predetermined brake operation amount. The driver is notified of support information prompting the driver to increase the brake operation amount when the permission condition is not satisfied after a predetermined time has elapsed since the vehicle was stopped. A braking force capable of maintaining a vehicle stop state is generated by a vehicle stop keeping control. The driver is notified of the support information when the brake operation amount decreases before the predetermined time has elapsed in a state in which the vehicle has been stopped by the brake operation and the vehicle stop keeping control is executed.

10 Claims, 4 Drawing Sheets

(51) Int. Cl.
*B60W 10/18* (2012.01)
*B60W 50/14* (2012.01)
*B60W 30/192* (2012.01)

(52) U.S. Cl.
CPC .......... *B60W 10/18* (2013.01); *B60W 30/192* (2013.01); *B60W 2540/12* (2013.01); *B60W 2710/06* (2013.01); *B60W 2710/182* (2013.01); *B60Y 2300/18108* (2013.01); *F02N 11/0822* (2013.01); *F02N 2200/102* (2013.01)

(58) Field of Classification Search
CPC ......... B60W 2710/06; B60W 2710/182; B60T 7/12; B60T 17/22; B60Y 2300/18108; B60Y 2300/192; F02N 11/0822; F02N 2200/102
See application file for complete search history.

(56) References Cited

U.S. PATENT DOCUMENTS

| 2012/0143440 | A1* | 6/2012 | Yu ......................... B60K 35/00 701/36 |
| 2016/0304096 | A1* | 10/2016 | Khafagy ......... B60W 30/18109 |
| 2017/0182989 | A1* | 6/2017 | Takeda ...................... B60T 7/12 |

FOREIGN PATENT DOCUMENTS

| JP | 2014-159752 A | 9/2014 |
| JP | 2015-93629 A | 5/2015 |
| JP | 2015-101207 A | 6/2015 |

* cited by examiner

INFORMATION PROVIDING METHOD FOR VEHICLE AND INFORMATION PROVIDING DEVICE FOR VEHICLE

CROSS-REFERENCE TO RELATED APPLICATIONS

This application is a U.S. national stage application of International Application No. PCT/JP2015/005472, filed on Oct. 30, 2015.

BACKGROUND

Field of the Invention

The present invention relates to an information providing method for a vehicle and an information providing device for the same.

Background Information

Conventionally, in an idle stop technique (also referred to as an idle reduction, idling stop) that automatically stops an engine, a technique is known for informing or notifying the driver of a control state, for example, as described in Japanese Laid-open Patent Application No. 2014-159752, hereinafter "Patent Document 1."
According to the technique described in Patent Document 1, in an idle stop unactuated state or in the out-of-operation state, information for prompting an idle stop to encourage the engine to be stopped (in the following description, referred to as "support information") will be displayed by an indicator light and the like to inform a driver. Note that the out-of-operation of the idle stop is caused by a state in which an operation amount of a brake pedal by the driver is less than a predetermined value, for example. Further, the support information indicates information and the like such that the operation amount of the brake pedal will be encouraged or urged to reach a predetermined value or more.

SUMMARY

However, in the technique described above in Patent Document 1, in order to suppress notification of the support information to the driver more than is necessary, it might be conceivable to perform such a control to stop notification of the support information when the driver operates to release a brake pedal. However, when performing the control above, when a time elapsed is short between when the support information starts to be notified and when the brake pedal is released by the driver, a problem is likely to occur that the support information will not be recognized by the driver. The present invention has been made in view of the above problem and aims to provide an information providing method for a vehicle and an information providing device for a vehicle in which, the possibility of misrecognition of the support information may be reduced to occur.

In order to solve the above problem, according to one aspect of the present invention, when a predetermined permission condition is satisfied in a state in which the vehicle is stopped by brake operation of a driver, the engine will be caused to be stopped automatically. Further, after elapse of a predetermined time following a vehicle stop, when the permission condition that a predetermined operation amount of brake is reached is not satisfied the support information for satisfying the permission condition is notified to the driver. However, prior to elapse of the predetermined time, in a state in which the vehicle is stopped by the brake operation and a vehicle stop keeping control for generating a braking force is in operation, in response to decrease in brake operation, the support information is notified to the driver. Note that the vehicle stop keeping control is intended for generating a braking force or torque that is capable of maintaining a vehicle stop state. The support information is such information that is intended to promote or prompt to satisfy the permission information.

According to one aspect of the present invention, either when a predetermined time has elapsed after the vehicle stop, or prior to elapse of the predetermined time after the vehicle stop with a brake amount decreasing operation, notification of the support information will be started. Thus, it is possible to provide an information providing method and information providing device for a vehicle in which, even when the time elapsed from the vehicle stop to when the driver releases the brake is short, the possibility that the driver misses to recognize the support information may be reduced.

DETAILED DESCRIPTION OF THE EMBODIMENTS

In the detailed description below, a description will be given of specific details of embodiments according to the present invention so as to provide a thorough understanding. However, even without such specific details, it is clear that one or more embodiments may be implemented. Further, in order to be concise with the drawings, well-known structures and devices may be shown only schematically.

First Embodiment

Below, a description will be given of a first embodiment according to the present invention with reference to the drawings.

Configuration of Information Providing Device for Vehicle

Figure 1:
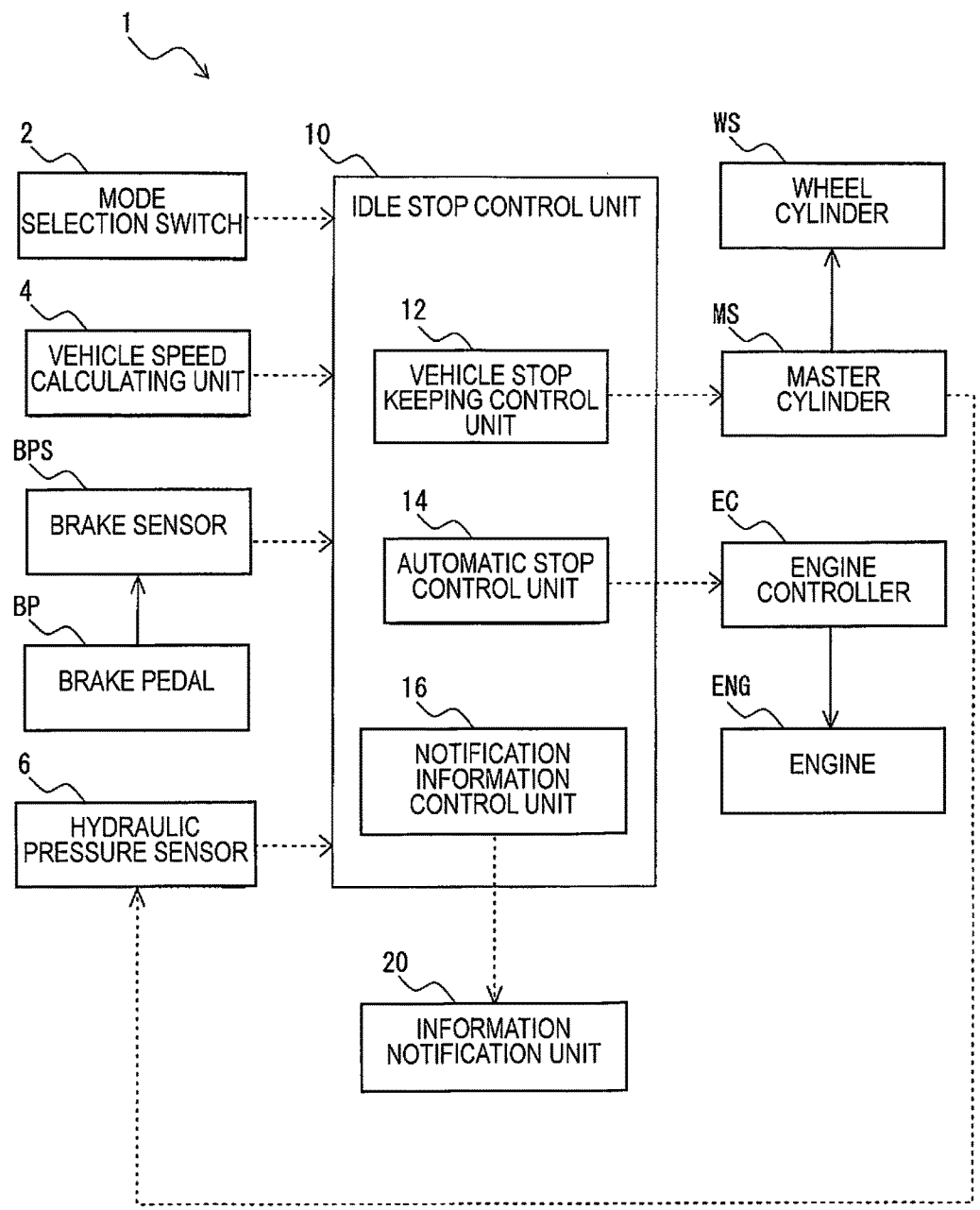
FIG. 1 is a block diagram showing a configuration of a vehicle information providing device of a first embodiment according to the present invention.
Figure 2:
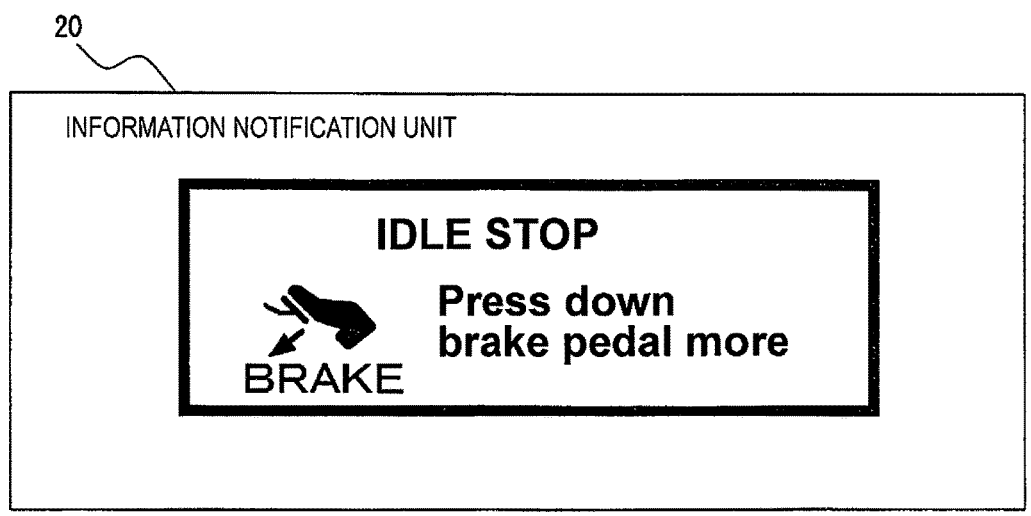
FIG. 2 is a diagram showing a state in which support information is turned on or lit on a display device.

With reference to FIGS. 1 and 2, the configuration of the vehicle information providing device 1 in the first embodiment is described. As represented in FIG. 1, the information providing device for a vehicle 1 includes an idle stop control unit 10 and an information notification unit 20. The idle stop control unit 10 is configured, for example, by a microcomputer, and is mounted on a vehicle equipped with a vehicle information providing device 1 (in the description below, referred to as "vehicle"). Incidentally, the microcomputer is configured with, for example, a CPU (Central Processing Unit), a RAM (Random Access Memory), and a ROM (Read Only Memory). Further, the idle stop control unit 10 receives input of information signals of a mode selection switch 2, a vehicle speed calculating unit 4, a brake sensor BPS, and a hydraulic pressure sensor 6.

The mode selection switch 2 is provided to select whether or not to perform a vehicle stop keeping control (also referred to as SSA: Stand-Still-Assist). The vehicle stop keeping control is intended for generating a braking force capable of maintaining the vehicle stop state even when the driver decreases the operation amount of the brake pedal BP from a state in which the vehicle is being stopped (vehicle stop state) with the operation of the brake pedal BP by the driver. That is, the vehicle stop keeping control is intended for a control for generating a braking force that is capable of maintaining the vehicle stop state despite the brake operation decreases or being reduced. In the first embodiment, as an example, a description will be given of a control in which the vehicle stop maintaining control is executed during transition from a state in which the vehicle is stopped by the operation of the brake pedal BP by the driver to a state in which the braking force is generated such that the vehicle stop state may be maintained even when the brake pedal BP is released by the driver.

In other words, the vehicle stop keeping control is provided for generating a braking force capable of maintaining a vehicle stop state as a control performed automatically on the vehicle side, irrespective of manual operation of the brake pedal BP by the driver. Note that "the brake pedal BP is released by the driver" is synonymous with the degree of opening of the brake pedal BP is brought to 0°. Also, from the mode selection switch 2 (in the description below, also referred to as "control selection signal"), information signal including the selection result of the vehicle stop keeping control is output to the idle stop control unit 10.

The vehicle speed calculating unit 4 receives an input of wheel speed signals from a wheel speed sensor (not shown) including a rotational speed of a wheel of the vehicle. Further, the vehicle speed calculating unit 4 uses the rotational speed included in the wheel speed signal to calculate a running speed of the vehicle (in the description below, also referred to as "vehicle speed"). Additionally, the vehicle speed calculating unit 4 outputs to the idle stop control unit 10 information signals including the calculated vehicle speed (in the description below, also referred to as "vehicle speed signal"). Note that the vehicle speed calculating unit 4, for example, may be configured to include a known VDC (Vehicle Dynamics Control) system. The wheel speed sensor is mounted on a vehicle. Further, the wheel speed sensor generates a predetermined number of vehicle speed pulses with respect to a vehicle mounted wheel per revolution of the wheel.

The brake sensor BPS is a sensor for detecting the operation amount of the brake pedal BP by the driver (depression amount). The brake pedal BP is a pedal that is subject to be depressed by the driver depending only on the braking force demand. The brake sensor BPS outputs to the idle stop control unit 10 an information signal including the operation amount of the brake pedal BP by the driver. Incidentally, the brake sensor BPS is formed, for example, by using a pedal stroke sensor. Further, the configuration of the brake sensor BPS is not limited to the structure formed by using the pedal stroke sensor. For example, it may be configured to detect a pressure of a master cylinder MS caused by depression operation of the driver (master cylinder pressure). That is, the brake sensor BPS is a sensor that detects the operation amount of the brake pedal BP by the driver (the brake operation).

The hydraulic pressure sensor 6 detects a hydraulic pressure of the brake fluid supplied from the master cylinder MS to a hydraulic system of the brake fluid (e.g., dual systems including primary system and secondary system). The hydraulic pressure sensor 6 (in the description below, also referred to as "hydraulic signal") outputs to the idle stop control unit 10 information signal including the detected hydraulic pressure. The information notification unit 20 is formed, for example, by using a display device (indicator) arranged in a combination meter or instrument cluster. In addition, the combination meter is installed in an instrument panel of the driver's seat. In accordance with the information signal input from the idle stop control unit 10, the information notification unit 20 selectively causes to turn off and light the support information shown in FIG. 2, on a display device disposed in the combination meter or to turn off the support information.

With a state where the vehicle stop keeping control is activated, the support information represents information necessary to establish the authorized or permission condition for carrying out the automatic stop of the engine (idling stop, idle reduction being synonymous with idle stop). That is, support information represents information for establishing permission condition for automatic engine stop. Note that the "state where the vehicle stop keeping control is activated" represents a state in which, regardless of the operation of the brake pedal BP by the driver, by automatically performing control on the vehicle side, braking force is generating to maintain the stopped state of the vehicle.

The permission condition is a condition that has been set in advance. In the first embodiment, as an example, a description will be given in a case where the permission condition is defined as the condition in which the hydraulic pressure of the brake corresponding to the operation amount of the brake pedal BP reaches a predetermined, permitted hydraulic pressure or more. Thus, the support information illustrated in FIG. 2 indicates to the driver for prompting or encouraging to increase the operation amount of the brake pedal BP in a state in which the brake hydraulic pressure corresponding to the operation amount of the brake pedal BP is less than the permitted hydraulic pressure in order to allow the brake hydraulic pressure to reach the permitted hydraulic pressure or more. Incidentally, the permissible hydraulic pressure is set, for example, to a pressure higher than the a brake hydraulic pressure that is able to maintains the stopped state of the vehicle on road surface of normal state, for example, on a snow-free flat road surface.

The display that prompts the driver to increase the operation amount of the brake pedal BP is specifically intended to mean character information expressing "Please further depresses the brake", or a display of icons representing the graphical relationship between the brake pedal BP and a driver's foot. Further, the permission condition may include conditions, for example, that steering angle of a steering wheel is within a threshold steering angle set in advance, the turning direction indicator is off, and/or shift position is at the drive range ("D" range, etc.). That is, the information notification unit 20 is intended for a configuration to notify an occupant of the vehicle of the support information for establishing the permission condition. Note that the information notification unit 20 may display information indicating that the vehicle stop keeping control is in operation (e.g., character information such as "SSA in operation").

Further, the idle stop control unit 10 includes a vehicle stop keeping control unit 12, an automatic stop control unit 14, and a notification information control unit 16. The vehicle stop keeping control unit 12 refers to a control selection signal received from the mode selection switch 2. Then, when the control selection signal includes the selection result of performing the vehicle stop keeping control, reference will be made to the vehicle speed signal input from the vehicle speed calculating unit 4 and the information signal input from the brake sensor BPS. Furthermore, the vehicle stop keeping control unit 12 determines whether or not to operate the vehicle stop keeping control in response to the vehicle speed included in the vehicle speed signal and the operation amount of the brake pedal BP included in the information signal received from the brake sensor BPS.

Specifically, when conditions A1 and A2 below are satisfied, a determination will be made to operate the vehicle stop keeping control. Conditions A1: Vehicle speed is zero (i.e., synonymous with 0 km/h, the same shall apply below). That is, the vehicle is stopped. Conditions A2: Operation amount of the brake pedal BP is a predetermined amount or more (e.g., zero or the amount to overcome creep torque, also the same applies in the following description). That is, the brake pedal BP is operated. When the vehicle stop keeping control unit determines to actuate or operate the vehicle stop keeping control 12, a command value for generating a braking force capable of maintaining the vehicle stop state of the vehicle (in the following description, also referred to as "vehicle stop keeping command value") is output to the master cylinder MS.

Furthermore, the vehicle stop keeping control unit 12 that has determined to execute the vehicle stop keeping control outputs to the automatic stop control unit 14 and the notification information control unit 16, an information signal (in the description below, may also be referred to as "vehicle stop keeping determination signal") including the determination result indicating to put the vehicle stop keeping control in operation. The automatic stop control unit 14, upon receiving an input of the vehicle stop keeping determination signal from the vehicle stop keeping control unit 12, determines whether or not the permission condition is satisfied. When it is determined that the permission condition is satisfied, a command to stop the engine ENG in rotation (in the description below, may be referred to as "engine stop command") is output to an engine controller EC and the notification information control unit 16. Thus, when the permission condition is satisfied in a state in which the braking force capable of maintaining the vehicle stop state is being generated, the automatic stop control unit 14 causes to stop the engine ENG of driving state (i.e., causes to operate an idle stop, idle reduction, idling stop).

The notification information control unit 16 determines, upon receiving an input of the vehicle stop keeping determination signal from the vehicle stop keeping control unit 12, whether or not input of the engine stop command from the automatic stop control unit 14 is received. That is, the notification information control unit 16 determines, in a state in which the vehicle stop keeping control is in operation, whether the permission condition is satisfied. Further, in a state in which the input of the vehicle stop keeping determination signal is received from the vehicle stop keeping unit 12, when input of the engine stop command is not received from the automatic stop control unit 14, then it is determined that the permission condition is not satisfied in a state in which the vehicle stop keeping control is in operation.

Upon determination that the permission condition is not satisfied in a state in which the vehicle stop keeping control is in operation, the notification information control unit 16 refers to the information signal subjected to the input from the brake sensor BPS. Then, when the operation amount of the brake pedal BP that is included in the information signal subjected to the input from the brake sensor BPS exceeds zero, i.e., when the brake pedal BP is operated, the information OFF signal is output to the information notification unit 20. The information OFF signal indicates an information signal including a command to turn off the support information. Therefore, the notification information control unit 16 will put the device in a standby state while withholding the support information in a state in which the vehicle is stopped with the brake operation and the vehicle stop keeping control is in operation, even when the permission condition is unsatisfied.

Further, the notification information control unit 16 determines in the notification standby state, from the time the vehicle stops, whether or not a predetermined turn-off time after vehicle stop has elapsed. In the first embodiment, as an example, the turn-off time after the vehicle stop is set to 2.3 seconds.

The notification information control unit 16 that has determined that the predetermined turn-off time after vehicle stop has elapsed after the vehicle stop outputs information signal including a command to turn on the support information on the display device (in the description below, also referred to an "information lighting signal") to the information notification unit 20. On the other hand, the notification information control unit 16, when determining that the turn-off time after vehicle stop has not yet elapsed, refers to the information signal subjected to input from the brake sensor BPS.

Then, the notification information control unit 16, when the operation amount of the brake pedal BP, included in the information signal subjected to input from the brake sensor BPS decreases before the turn-off time after vehicle stop has elapsed, outputs information turn-on signal to the information notification unit 20. In the first embodiment, as an example, the configuration of the notification information control unit 16 is such that, when the operation amount of the brake pedal BP included in the information signal subjected to input from the brake sensor BPS decreases to zero, the information turn-on or lighting signal will be output to the information notification unit 20. That is, in the first embodiment, the configuration of the notification information control unit 16 is such that, in a state in which the support information is not broadcast and notified, when determined that one of a first condition and a second condition is satisfied, as described below, the information turn-on signal will be output to the information notification unit 20. The first condition refers to a condition in which the permission condition is satisfied when the turn-off time after vehicle stop has elapsed. The second condition refers to a condition in which the permission condition is satisfied when the decreasing operation of the brake pedal BP has been performed.

In the first embodiment, as an example, when the operation of the brake pedal BP is released, it is determined that the second condition is satisfied. Further, the notification information control unit 16 outputs, after outputting the support information lighting signal to the information notification unit 20 and upon elapse of a notification reserved time, the information turn-off or extinguishing signal to the information notification unit 20. The notification reserved time is a predetermined time secured in advance. Further, the notification reserved time is set, similar to the notification duration time, for example, according to a vehicle class (rating of the vehicle corresponding to an exhaust volume engine ENG or body size and engine ENG) and the position of the display device (set according to the viewing position)

provided in the information notification unit 20. In the first embodiment, as an example, the notification reserved time is set to 2 seconds.

As described above, the notification information control unit 16 puts the device in the notification standby state in a state in which the vehicle is stopped with the operation of the brake pedal BP by the driver and when the vehicle stop keeping control is in operation, even when the permission condition is unsatisfied. Further, the notification information control unit 16 starts notification of support information from the information notification unit 20 when determined one of the first and second conditions is satisfied, to start broadcast or notification of the support information from the information notification unit 20. That is, the notification information control unit 16, after the predetermined time following the vehicle stop has passed, when the brake operation amount is less than a predetermined operation amount ensuring the predetermined permission condition, the support information prompting to increase the brake operation will be output from the information notification unit 20.

In addition, the notification information control unit 16, when the braking operation decreases, allows to notify the support information from the notification unit 20. Control to notify the support information from the information notification unit 20 in response to decrease in the brake operation takes place when the vehicle is stopped due to brake operation and the vehicle stop control is in operation to generate a braking force, and before a predetermined time has elapsed from the vehicle stop. In the first embodiment, as an example, the predetermined time after vehicle stop is set to a turn-off time after vehicle stop. Further, in the first embodiment, the predetermined operation amount is set to an operation amount of the brake pedal BP at which the brake hydraulic pressure reaches a predetermined permission hydraulic pressure or more. That is, the notification of the support information from the information notification unit 20 is not performed until the turn-off time after vehicle stop elapse following a vehicle stop, or the operation amount of the brake pedal BP decreases prior to elapse of the turn-off time after vehicle stop.

Further, the notification of the support information from the information notification unit 20 is started either at the time when the turn-off time after vehicle stop elapses following a vehicle stop, or when the operation of the brake pedal BP by the driver is released. Furthermore, the notification information control unit 16 will stop notification of the support information at the time when the notification reserved time has elapsed from the start of the notification of the support information from the notification unit 20. The master cylinder MS is a device for supplying the brake oil (brake fluid) to the wheel cylinder WS. The master cylinder MS causes to operate a braking motor (not shown), for example, accommodated in the master cylinder MS to move a piston in the master cylinder MS in accordance with the stop keeping command value received from the idle stop control unit 10. Thus, in the master cylinder MS, a hydraulic pressure is generated corresponding to the vehicle stop keeping command value. Then, the hydraulic pressure of the brake fluid in accordance with the stop keeping command value will be supplied to the wheel cylinder WS.

The wheel cylinder WS is operable to generate a pressing force for pressing a brake pad constituting the disk brake (not shown) to a disk rotor (not shown). The disk rotor rotates integrally with the wheel W, and frictional resistance is generated by contacting the brake pad. That is, the master cylinder MS and the wheel cylinder WS are mounted on the wheel to form a friction brake to generate a frictional braking force on the wheels. The engine controller EC is operable to stop the engine ENG in operation in response to an engine stop command received from the idle stop control unit 10. The engine ENG forms a driving force or torque source of the vehicle. As described above, the idle stop control unit 10 uses the various types of information signals received to control the master cylinder MS, the engine controller EC, and the information notification unit 20 provided in the vehicle.

Processing Performed by Idle Stop Control Unit

Figure 3:
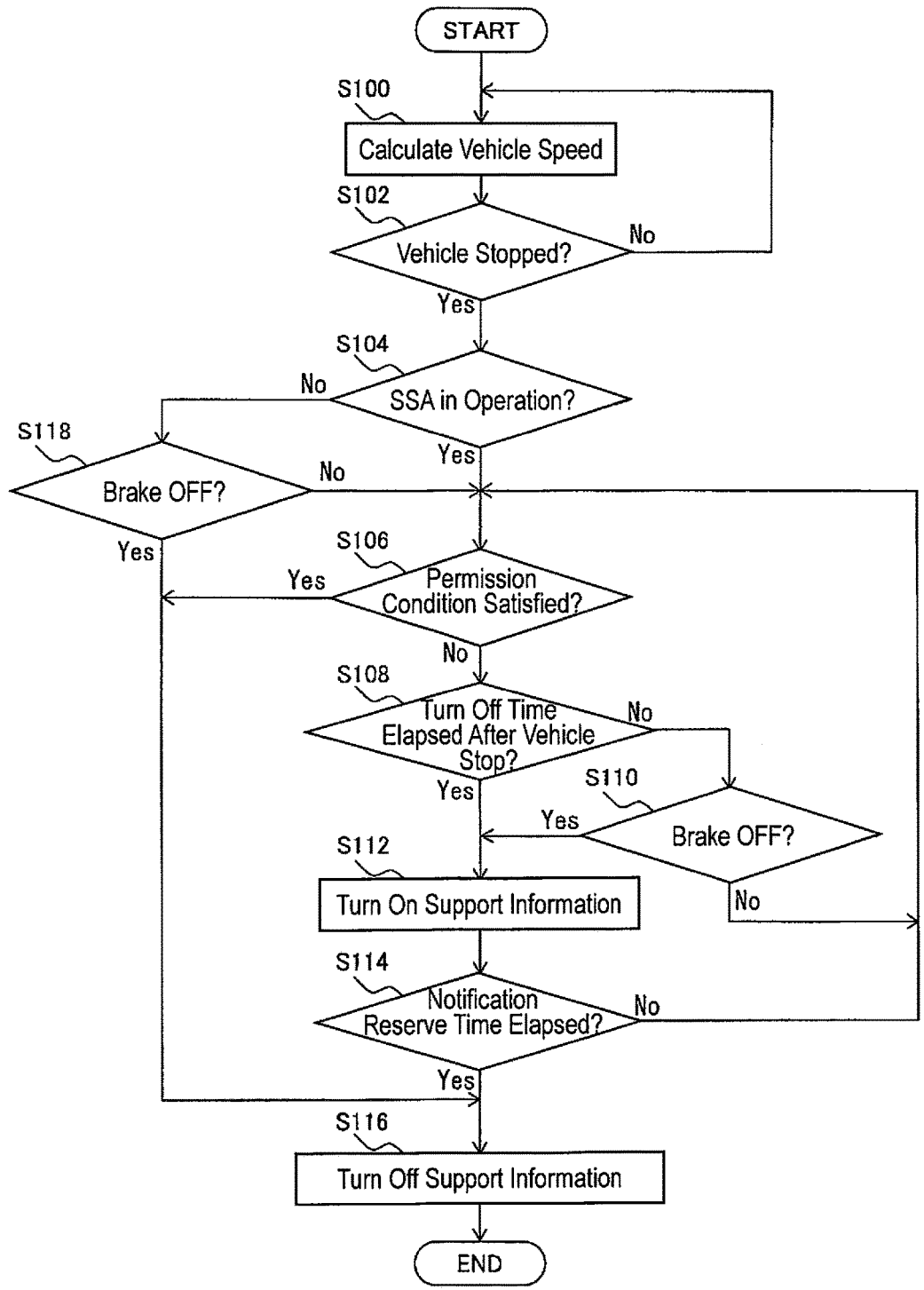
FIG. 3 is a flow chart showing processing of the vehicle information providing device that implements the first embodiment according to the present invention.

With reference to FIGS. 1 and 2, and using FIG. 3, an example of processing performed by the idle stop control unit 10 is given. In the description below, the processing of the idle stop control unit 10 may be referred to as "information providing process for vehicle". Further, the process illustrated in FIG. 3 specifies the processing in a case in which the mode selection switch 2 is selected to perform the vehicle stop keeping control. As represented in FIG. 3, when starting the information providing process (START), processing of step S100 is executed. In step S100, the vehicle speed calculating unit 4 calculates a vehicle speed (specified in FIG. 3 as "Calculate vehicle speed"). After calculating the vehicle speed in step S100, the vehicle control process proceeds to step S102.

In step S102, it is determined whether or not the vehicle is stopped (expressed as "Vehicle stopped?" in FIG. 3) by confirming that the vehicle speed calculated in step S100 is zero. When determined in step S102 that the vehicle is stopped (expressed as "Yes" in FIG. 3), the information providing process proceeds to step S104. On the other hand, in step S102, when determined that the vehicle is not stopped (expressed as "No" in FIG. 3), the information providing process proceeds to step S100.

In step S104, processing is performed by the vehicle stop keeping control unit 12 for determining whether or not z vehicle stop keeping command value is output to a master cylinder MS. That is, processing is carried out in step S104 for determining whether or not the vehicle stop keeping control is activated or in operation (expressed as "SSA in operation?" in FIG. 3). In step S104, when the vehicle stop keeping control is determined to be in operation (expressed as "Yes" in FIG. 3), the information providing process proceeds to step S106. On the other hand, in step S104, when determined that the vehicle stop keeping control is not in operation (expressed as "No" in FIG. 3), the information providing process proceeds to step S118.

In step S106, by an automatic stop control unit 14, processing is performed for determining whether or not the permission condition is satisfied (expressed as "Permission condition satisfied?" in FIG. 3). In step S106, when the permission condition is determined to be satisfied (expressed in as "Yes" in FIG. 3), the information providing process proceeds to step S116. On the other hand, in step S106, when determined that the permission condition is not satisfied (expressed as "No" in FIG. 3), the information providing process proceeds to step S108.

In step S108, processing is carried out by a notification information control unit 16 for determining whether or not a turn off time after vehicle stop (2.3 seconds) has elapsed (referred to as "Turn off time elapsed after vehicle stop?" in FIG. 3). In step S108, when determined that the turn off time after vehicle stop has elapsed (shown as "Yes" in FIG. 3) after it has been determined in step S102 that the vehicle is stopped, the information providing process proceeds to step S112. On the other hand, in step S108, when determined that the turn off time has not elapsed after the vehicle stop (shown as "No" in FIG. 3) after it has been determined in step S102 that the vehicle is stopped, the information providing process proceeds to step S110.

In step S110, processing is performed by a notification information control unit 16 for determining whether or not the operation amount of the brake pedal BP is zero (indicated as "brake OFF" in FIG. 3). In step S110, when determined that the operation amount of brake pedal BP decreases to zero (expressed as "Yes" in FIG. 3), the information providing process proceeds to step S112. On the other hand, in step S110, when determined that the operation amount of the brake pedal BP exceeds zero (indicated as "NO" in FIG. 3), the information providing process for a vehicle proceeds to step S106.

In step S112, the information turn on or light-up signal is output from the notification information control unit 16 to the information notification unit 20. Thus, in step S112, the support information is lit on the display device (expressed as "Turn on support info." in FIG. 3). In step S112, when the support information is lit and turned on, the information providing process proceeds to step S114. In step S114, processing is performed by the notification information control unit 16 for determining whether or not the notification reserved time (2 seconds) has elapsed (expressed as "notification reserved time elapsed" in FIG. 3) after the support information has been lit on the display device in step S112.

In step S114, when determined that a notification reserved time has elapsed (expressed as "Yes" in FIG. 3) after the support information has been lit on the display device in step S112, the information providing process proceeds to step S116. On the other hand, when determined in step S114 that the notification reserved time has not yet elapsed (expressed as "NO" in FIG. 3) after the support information has been lit on the display device in step S112, the information providing process proceeds to step S106.

In step S116, an information turn-off signal is output from the notification information control unit 16 to the information notification unit 20. Thus, in step S116, the support information that is lit on the display device will be turned off (expressed as "Turn off support Info." in FIG. 3). In step S116, when turning off the support information that has been lit on the display device, the information providing process ends (END). In step S118, similar to step S110, processing is performed by the notification information control unit 16 for determining whether or not the operation amount of the brake pedal BP is zero (expressed as "brake OFF" in FIG. 3). In step S118, when the operation amount of the brake pedal BP is determined to be zero (expressed as "Yes" in FIG. 3), the information providing process proceeds to step S116. On the other hand, in step S118, when determined that the operation amount of the brake pedal BP is greater than zero (expressed as "No" in FIG. 3), the information providing process proceeds to step S106.

Operations

With reference to FIGS. 1 to 3, and primarily based on FIG. 4, an example of the operations will be explained, which is performed using the vehicle information providing device 1 in the first embodiment. Incidentally, in FIG. 4, a time chart of operations is shown, which are performed by the configuration according to the vehicle information providing device 1 in the first embodiment. Also, in the time chart shown in FIG. 4, a case is depicted in which the mode selection switch 2 is selected to execute the vehicle stop keeping control. The time chart shown in FIG. 4 starts from a state in which the driver operates or pushes down a brake pedal BP (i.e., Brake ON) during travel of the vehicle (i.e., vehicle speed>0). Incidentally, in the profile expressed as "Brake" in FIG. 4, a situation in which the operation amount of the brake pedal BP is zero is expressed as "OFF" while another situation in which the operation amount of the brake pedal BP exceeds zero is expressed as "ON".

Figure 4:
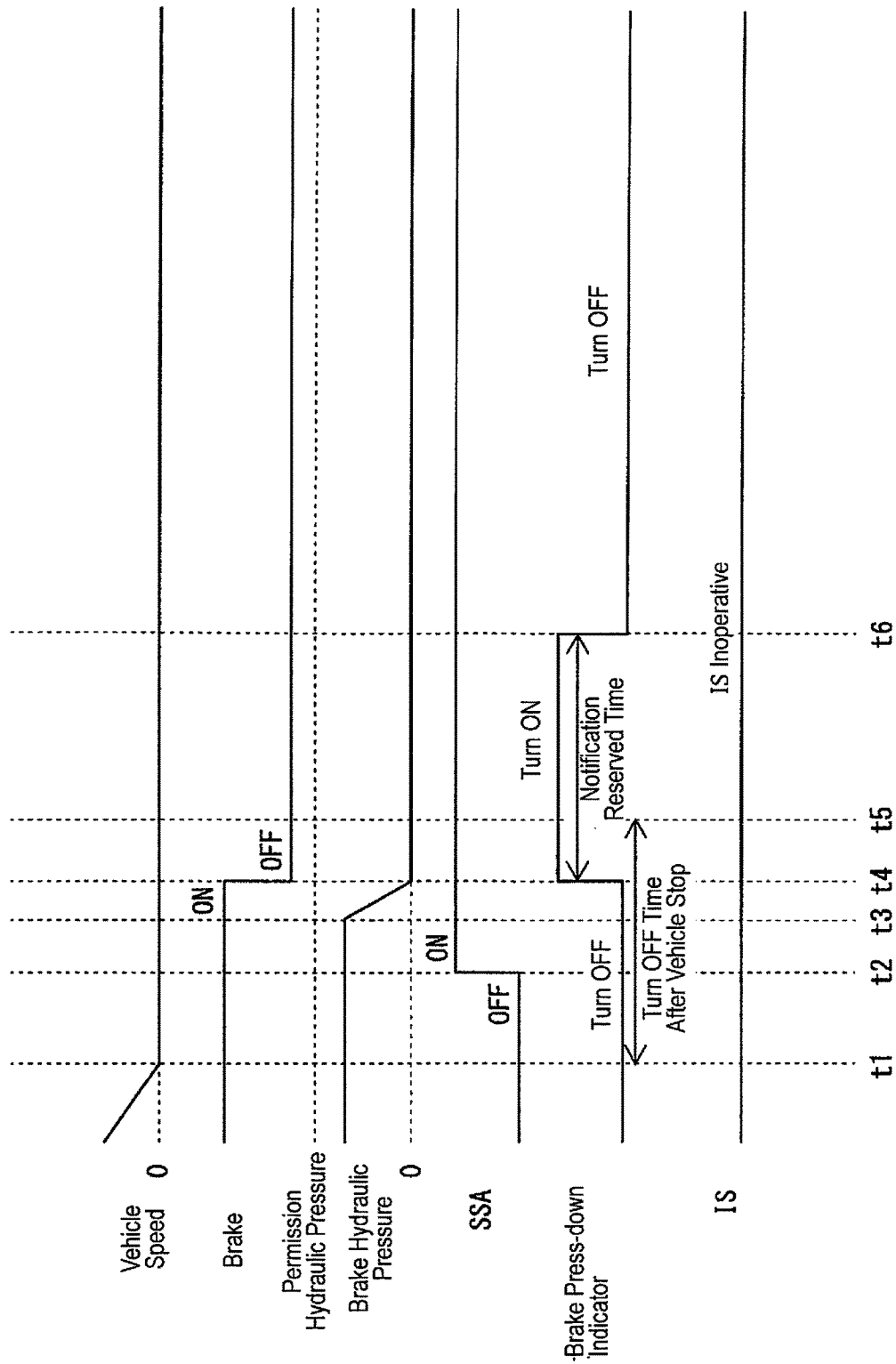
FIG. 4 is a time chart showing an operation of the vehicle to which a configuration of the vehicle information providing device in the first embodiment is applied according to the present invention.

At the starting time of the time chart shown in FIG. 4, since a brake fluid or hydraulic pressure corresponding to the operation amount of the brake pedal BP of the driver is generated, the vehicle speed decreases. Further, at the starting time of the time chart shown in FIG. 4, the vehicle stop keeping control is not in operation (SSA OFF). Thus, the support information is off (brake press-down prompting indicator OFF). Furthermore, at the starting time of the time chart shown in FIG. 4, the engine is in operation and driven. Thus, the idle stop is not in operation or activated (IS inoperative). Note that, on the profile expressed as "SSA" in FIG. 4, a state in which the vehicle stop keeping control is in operation is expressed as "ON" while a state in which the vehicle stop keeping control is not in operation is expressed as "OFF". Similarly, in the profile graph expressed as "brake press-down prompting indicator" in FIG. 4, a state in which the support information is lit is expressed as "lit", while a state in which the support information is extinguished and turned off is expressed as "OFF". Furthermore, in the profile expressed as "IS" in FIG. 4, a state in which the idle stop is not in operation is expressed as "IS inoperative".

At the time (time t1) in FIG. 4 when the vehicle speed reaches zero, i.e., when the vehicle comes to stop, it is determined whether or not a condition is satisfied in which the operation amount of the brake pedal BP is greater than zero. Then, at the time in which the operation amount of the brake pedal BP is determined to be greater than zero (time t2), the vehicle stop keeping control is operated (SSA ON). In addition, at the time t2, the vehicle is being stopped with the operation of the brake pedal and the vehicle stop keeping control is in operation. Thus, at time t2, even when the permission condition is unsatisfied, a notification standby state starts in which the support information is withheld from being notified. Incidentally, the brake hydraulic pressure at time t1 represents, for example, with respect to the creep torque generated in the vehicle with the engine ENG being driven, a brake hydraulic pressure that is great enough to maintain the vehicle stop state.

After time t2, the operation amount of the brake pedal BP by the driver starts decreasing (time t3). At the time in which the operation amount of the brake pedal BP is zero (time t4), the brake hydraulic pressure that has started decreasing from time t3 will reach zero at time t4 (expressed as "0" in FIG. 4). Incidentally, the brake hydraulic pressure being zero has the same meaning with the brake hydraulic pressure attaining 0 kg/cm$^2$. That is, at time t4, the operation amount of the brake pedal as well as the brake hydraulic pressure will reach zero (Brake pedal OFF, brake hydraulic pressure zero).

Here, as shown in FIG. 4, when time t4 is positioned before elapse of the turn-off time after the vehicle stop (time t5) from time t1, it is determined that the second condition described above is satisfied. That is, time t4 represents a time point in which the operation of the brake pedal BP is released in the notification standby state. Thus, at time t4, the support information will be turned on (brake press-down or depression increment indicator lit or turned on). That is, at time t4, before the turn-off time after vehicle stop has elapsed, the operation amount of the brake pedal BP has decreased to zero so that the second condition is determined to be satisfied and the support information will be started to be notified.

Further, on the time chart in FIG. 4, up to the time t4, since the brake hydraulic pressure is lower than the permission hydraulic pressure, the permission condition will not be satisfied. Thus, the automatic stop of the engine ENG is not performed. In other words, from the start on the time chart shown in FIG. 4 to the time point t4, the engine is being driven, and the idle stop is not activated (IS inoperative). Then, when a notification reserved time has elapsed (at time t6), the support information that has been lit at time t4 will be turned off and extinguished (Brake press-down or depression increment indicator OFF). Although not shown, in the operation performed using the vehicle information providing device 1 in the first embodiment, in a state in which the support information is being lit, when the accelerator pedal provided in the vehicle is operated, the support information will be turned off.

As described above, in the information providing device 1 of the first embodiment, when the permission condition is not satisfied in a state in which the vehicle stop keeping control is in operation, the following controls C1 and C2 below will be executed. Control C1 is executed until the turn-off time after vehicle stop has passed, or, until the operation amount of the brake pedal BP decreases before elapse of the turn-off time after the vehicle stop. In control C1, the support information is not given to a vehicle occupant. In control C2, the support information is started to be notified at the time at which the turn-off time after vehicle stop has elapsed in a state of no notification of the support information, or at the time at which the operation to decrease the operation amount of the brake pedal is released. Accordingly, even when the elapsed time until the driver releases the operation of the brake pedal BP from time t1 of vehicle stop is short, it is possible to reduce the possibility that the driver cannot recognize the support information.

As described above, according to the information providing method for a vehicle using the information providing device 1 in the first embodiment, in a state in which the vehicle is stopped by operation of the driver on the brake pedal BP, when the permission condition is satisfied, the engine ENG is automatically stopped. Further, after elapse of a predetermined time following the vehicle stop, when the permission condition is not satisfied and the brake hydraulic pressure does not reach a predetermined permission hydraulic pressure or more, the support information prompting to push down the brake for depression increment thereof is notified to the driver. Furthermore, in a state in which the vehicle is stopped with the brake operation and the vehicle stop keeping control is in operation, and prior to elapse of a predetermined time following the vehicle stop, in response to decrease in brake operation, the support information is notified to the driver. Incidentally, the first embodiment described above is an example of the present invention. The present invention is not limited to the first embodiment described above. Even in configurations other than the present embodiment, various modifications in design and the like are available unless they do not depart from the technical idea of the present invention.

Effects of the First Embodiment

According to the information providing method for a vehicle using the information providing device 1 in the first embodiment, it is possible to attain the effects explained below:

(1) When a predetermined permission condition is satisfied in a state in which the vehicle is stopped by a brake operation of a driver, the engine will be stopped automatically. Further, after elapse of a predetermined time following a vehicle stop, when the permission condition is not satisfied i.e., a predetermined operation amount of brake is not reached or depressed, the support information for satisfying the permission condition is notified to the driver. Furthermore, prior to elapse of the predetermined time, in a state in which the vehicle is stopped due to the brake operation and a vehicle stop keeping control is in operation, in response to decrease in the brake operation, the support information is also notified to the driver.

Accordingly, either when a predetermined time (turn-off time after vehicle stop) has elapsed after the vehicle stop, or prior to elapse of the predetermined time after the vehicle stop (turn-off time after vehicle stop) in response to the brake amount decreasing operation, notification of the support information will be started. Consequently, even when the time elapsed from the vehicle stops to when the driver releases the brake is short, it is possible to reduce the possibility that the driver misses to recognize the support information. Thus, it is possible to control for suppressing to provide the notification more than necessary for the driver. Also, it is possible to reduce the possibility that the driver is unable to recognize the support information.

(2) When the brake operation is released (when the operation of the brake pedal BP is released), the support information is notified to the driver. Therefore, in a state in which the vehicle stop keeping control maintains the vehicle stop state, the support information may be provided such that the driver who releases the operation of the brake pedal BP may be given plenty of time to recognize the support information. Consequently, even when the time elapsed from the vehicle stops to when the driver releases the brake is short, it is possible to reduce the possibility that the driver misses to recognize the support information.

(3) When the notification reserved time has elapsed from the start of the notification of the support information, the notification of the support information will be stopped. Therefore, in a state in which a braking force capable of maintaining the vehicle stop state is being generated, even when the driver releases operation of the brake pedal BP, it is possible to notify the support information at least during the notification reserved time. Consequently, even when the time elapsed from the vehicle stops to when the driver releases the brake is short, it is possible to reduce the possibility that the driver misses to recognize the support information. Further, according to the information providing device 1 for a vehicle in the first embodiment, it is possible to achieve the effect described below.

(4) When an automatic stop control unit 14, when determined that a permission condition in satisfied in a state in which a vehicle is stopped due to operation of a brake pedal BP by the driver, causes an engine ENG to be stopped automatically. In addition, the notification information control unit 16 is configured to allow the support information prompting increase in brake operation to be notified from an information notification unit 20 when the permission condition is unsatisfied, i.e., the operation amount of brake does not reach a predetermined operation amount. Still further, when the vehicle is stopped with the brake operation and the vehicle stop keeping control is in operation, and further prior to elapse of the predetermined time following the vehicle step, in response to decrease in brake operation, the support information will be notified from the information notification unit 20.

Thus, either when the predetermined time after vehicle stop (turn-off time after vehicle stop) following the vehicle stop has elapsed, or before elapse of the predetermined time after vehicle stop (turn-off tie after vehicle stop) when a decreasing operation of the brake pedal BP is performed, the support information will be started to be notified. Consequently, even when the time elapsed from the vehicle stops to when the driver releases the brake is short, it is possible to reduce the possibility that the driver misses to recognize the support information. Thus, it is possible to control for suppressing to provide the notification more than necessary for the driver. Also, it is possible to reduce the possibility that the driver is unable to recognize the support information.

Modification of the First Embodiment (1) In the first embodiment, when the operation of the brake pedal BP is released, the support information is configured to be broadcast or notified to the driver. However, configuration for notifying the driver the support information is not limited thereto. That is, it may be configured such that, when decrease of the braking operation is started (when the operation in the decreasing direction of the brake pedal BP is started), the support information may be notified to the driver. In this case, in the time chart shown in FIG. 4, at time t3, the support information will be turned on (brake press-down or depression increment indicator will be lit). In this configuration, as compared to the arrangement for notifying the driver the support information when the operation of the brake pedal BP is released, it is possible to notify the support information at an earlier point in time reflecting the intention of the driver to release the operation of the brake pedal BP. Accordingly, as compared to the arrangement for notifying the driver the support information when the operation of the brake pedal BP is released, it is possible to reduce the possibility that the driver is unable to recognize the support information.

(2) In the first embodiment, when the operation of the brake pedal BP is released, the support information is configured to be broadcast or notified to the driver. However, configuration for notifying the driver of the support information is not limited thereto. That is, at any point in time between the time in which the operation of the brake pedal BP in the decreasing direction is started and the time in which operation of the brake pedal BP is released, it may be configured such that the condition of brake pedal BP in the decreasing direction is performed is satisfied.

(3) In the first embodiment, although the support information is, as represented in FIG. 2, an indication or display for prompting the driver to increase the operation amount of the brake pedal BP, the support information is not limited to this example. That is, the support information may be, for example, a sound (voice, alarm, etc.) to encourage the driver to increase the operation amount of the brake pedal BP.

(4) In the first embodiment, the brake operation by the driver is specified as the operation of the brake pedal BP by the driver. However, the operation by the driver is not limited thereto. That is, when the configuration of the vehicle is such that, for example, a brake lever is provided for instructing the braking force of the vehicle by manipulating by hand, the operation of the brake lever by the driver may be interpreted as the brake operation by the driver.

The invention claimed is:

1. An information providing method for a vehicle, comprising:
stopping an engine automatically when a predetermined permission condition is satisfied in a state in which the vehicle is stopped by a brake operation executed by a driver;
notifying the driver of support information prompting the driver to increase a brake operation amount when the predetermined permission condition is not satisfied after a predetermined time has elapsed since the vehicle was stopped, the predetermined condition being a state in which a predetermined operation amount of a brake of the vehicle has been reached;
starting a vehicle stop keeping control that generates a braking force capable of maintaining the stopped state of the vehicle even when the brake operation is decreased; and
notifying the driver of the support information before the predetermined time has elapsed when the brake operation decreases in a state in which the vehicle has been stopped by the brake operation and the vehicle stop keeping control is generating the braking force.

2. The information providing method according to claim 1, wherein
the support information is notified to the driver when the brake operation is released.

3. The information providing method according to claim 2, wherein
the notification of the support information is stopped when a notification reserved time has elapsed since the notification of the support information started.

4. The information providing method according to claim 1, wherein
the support information is be notified to the driver when a decrease of the brake operation amount is started.

5. The information providing method according to claim 4, wherein
the notification of the support information is stopped when a notification reserved time has elapsed since the notification of the support information started.

6. The information providing method according to claim 1, wherein
the notification of the support information is stopped when a notification reserved time has elapsed since the notification of the support information was started.

7. An information providing device for a vehicle, comprising:
an automatic stop control unit configured to stop an engine of the vehicle automatically when a predetermined permission condition is satisfied in a state in which the vehicle is stopped by a brake operation executed by a driver;
a vehicle stop keeping control unit configured to start a vehicle stop keeping control to generate a braking force capable of maintaining the stopped state of the vehicle even when a brake operation amount is decreased;
an information notification unit configured to notify the driver of support information for satisfying the predetermined permission condition; and
a notification information control unit configured to control the notification unit to notify the support information prompting the driver to increase the brake operation amount when the predetermined permission condition is not satisfied after a predetermined time has elapsed since the vehicle was stopped, the predetermined condition being a state in which a predetermined operation amount of a brake of the vehicle has been reached, the notification information control unit being further
configured to control the information notification unit
to notify the support information before the predetermined time has elapsed when the brake operation
decreases in a state in which the vehicle has been
stopped by the brake operation and the vehicle stop
keeping control is generating the braking force.

8. The information providing device according to claim 7, wherein
the notification information control unit notifies the driver of the support information when the brake operation is released.

9. The information providing device according to claim 7, wherein
the notification information control unit notifies the driver of the support information when a decrease of the brake operation amount is started.

10. The information providing device according to claim 7, wherein
the notification information control unit stops the notification of the support information when a notification reserved time has elapsed since the notification of the support information started.

* * * * *